United States Patent Office 3,138,406
Patented June 23, 1964

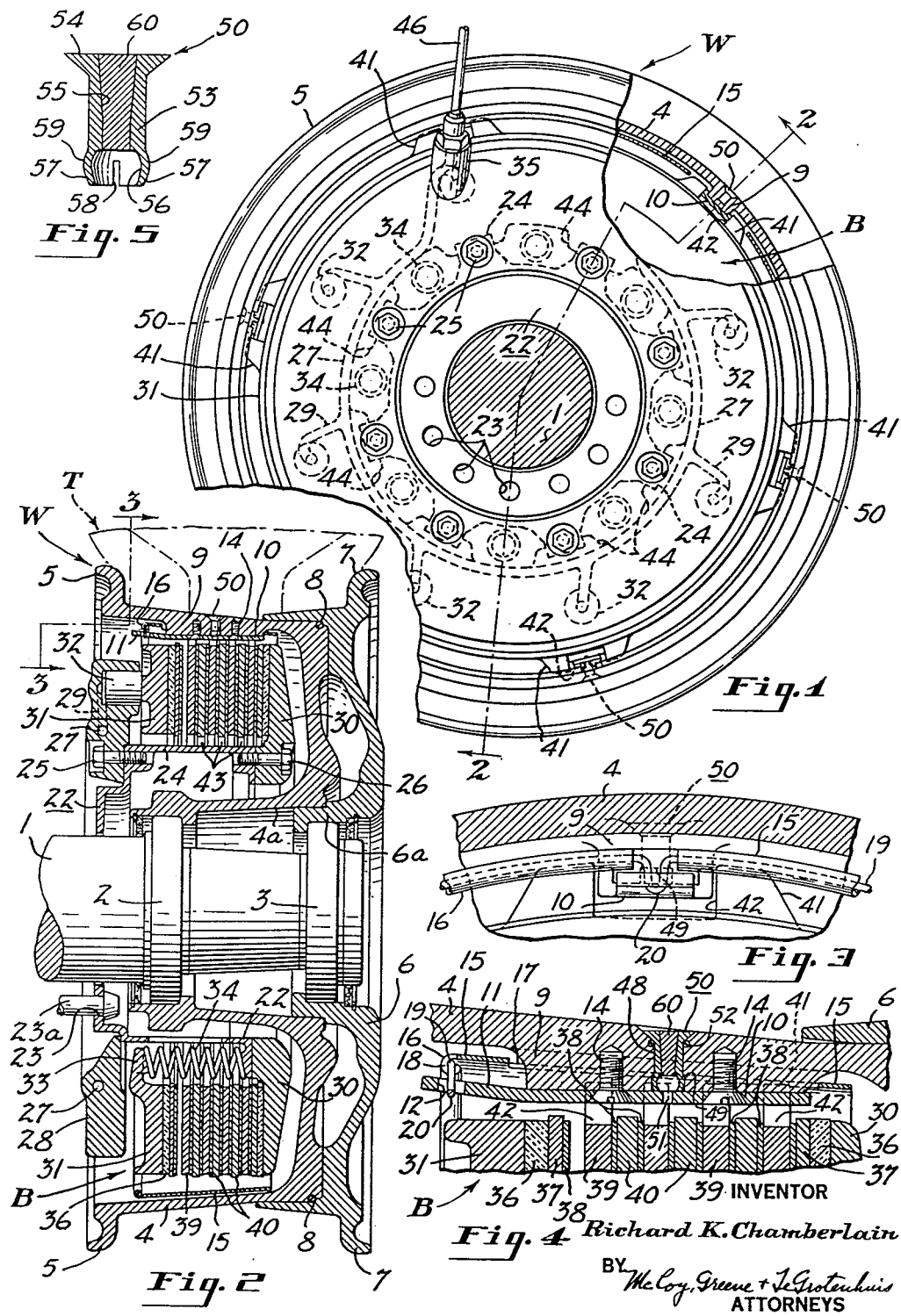

3,138,406
FUSE PLUGS FOR WHEELS
Richard K. Chamberlain, Akron, Ohio, assignor to The General Tire & Rubber Company, Akron, Ohio, a corporation of Ohio
Filed Sept. 29, 1960, Ser. No. 59,250
6 Claims. (Cl. 301—6)

The present invention relates to air pressure release means for airplane wheels employing high pressure tires to release air from the tires when the temperature of the wheel becomes dangerously high so as to prevent explosion of the wheel by high air pressure, and relates more particularly to a wheel having a series of air release holes sealed by tubular rivets, each containing a material which melts or disintegrates at a temperature materially lower than the melting point of the wheel material.

Heretofore, airplane wheels have exploded due to weakening of the wheel by the heat generated during braking of the wheel and the transfer of such heat to the portions of the wheel withstanding the extremely high tire pressure reacting against the rim flanges. Airplane wheels made of aluminum or magnesium alloys are seriously weakened when heated to temperatures greatly in excess of 150° C. and such wheels have exploded sending shrapnel through the wings, the fuselage, and the engine due to the transfer of heat from the brakes to the wheel, particularly where the tires used on the wheel employ air pressures of 300 or 400 pounds per square inch. When the brakes were dragged during take-off due to improper adjustment or due to the use of the brakes to maintain direction during a cross-wind taxi, the wheel has sometimes exploded after being retracted into the wing after take-off, but the explosions are more apt to occur after a landing or after a rejected take-off where the brakes are abused or where an excessive number of stops are made in a short period of time.

The explosion of the wheels can be avoided by reducing the rate of heat transfer from the brakes (which often reach temperatures of 500° to 600° C. or more) to the outer portions of the wheel and by avoiding overheating of the brakes or by employing lower pressures in the tires, but these solutions are not satisfactory for modern jet airplanes and particularly military aircraft.

The present invention provides an improved means for protecting the airplane against exploding wheels. According to the invention, the portion of the wheel between the tire-engaging rim flanges is provided with a series of circumferentially spaced smooth-bore air release holes which are so shaped that they do not seriously weaken the wheel and so that they can receive small rivet-like fuse plugs. The invention provides a fuse plug for each air release hole in the form of a tubular rivet which requires very little space and which engages a rubber O-ring seal to provide a reliable air tight seal, the passage through the rivet being sealed with a low melting alloy or other suitable fusible material.

The rivet eliminates the need for threads which are undesirable due to the provision of stress concentration points and weakening of the wheel. External threads are undesirable since they do not provide an effective seal particularly when used in conjunction with an elastic rubber O-ring. Tubular bolts are not suitable for similar reasons even through these can be used with smooth bore holes, since there is usually the problem of insufficient room for bolt heads or the like in modern wheel assemblies.

The tubular rivet of the present invention preferably is of a size to fit in each air release hole with a minimum clearance, and the end of the rivet opposite the head thereof is preferably shaped to engage the interior surface of the hole and contract radially as in a blind rivet, whereby the elasticity of the end portion of the rivet holds it in place in the hole or expands the end of the rivet after insertion into the hole so as to hold the rivet in place and prevent it from falling out of the hole accidentally.

The tubular rivets of the present invention are preferably located at the hottest portions of the wheel so as not to release the air pressure before it is necessary to do so. According to this invention, a heat shield is provided around the brake assembly within the wheel, and the rivet-like fuse plugs are mounted at the hottest portions of the wheel not protected by the heat shield, the heat shield insuring that the uppermost part of the wheel spaced from the fuse plugs does not reach a higher temperture than the hottest fuse plug during and after the rotation of the wheel has been stopped. The keys of the airplane wheel engaging the rotor plates of the brake may be provided with extensions for supporting the heat shield and with holes for communicating with the fuse plugs of this invention to release the air.

An object of the present invention is to provide reliable effective means which release air from a high pressure airplane tire only when the temperature of the wheel is excessively high and which do not materially weaken the wheel due to the provision of stress concentration zones.

A further object of the present invention is to provide a fuse plug for an air release hole which occupies an extremely small space and which provides a reliable, effective seal.

Another object of the present invention is to provide means for preventing excessive heat transfer from a brake to a wheel and for insuring that the fusible material for the air release opening is located at the hottest part of the wheel to avoid premature release of air during slow heating of the wheel.

A further object of the invention is to provide a fuse plug in the form of a blind rivet which does not require special tools for mounting or dismounting and which may easily be mounted on or removed from the wheel to permit replacement of the rubber O-ring seal when the tire is removed without further disassembling the wheel.

Other objects, uses and advantages of the invention will become apparent to those skilled in the art from the following description and claims and from the drawings in which:

FIGURE 1 is a fragmentary front elevational view on a reduced scale with parts omitted and with parts broken away and shown in section, showing an airplane wheel constructed according to the present invention;

FIGURE 2 is a sectional view taken substantially on the line 2—2 of FIG. 1 and on the same scale, the position of the pneumatic rubber tire being shown in dot-dash lines;

FIGURE 3 is a fragmentary sectional view taken on the line 3—3 of FIG. 2 and on a larger scale;

FIGURE 4 is a fragmentary sectional view similar to FIG. 2 and on a larger scale, the parts being shown in their positions immediately after the brake is released; and FIGURE 5 is a sectional view showing the fuse plug used in the wheel of FIGS. 1 to 4.

Referring more particularly to the drawings in which like parts are identified by the same numerals throughout the several views, FIGS. 1 and 2 show an airplane wheel W containing a conventional disc-type brake assembly B and mounted for rotation on a conventional axle 1 by means of roller bearings 2 and 3. The wheel comprises a main annular portion 4 having a tire-engaging rim flange 5 and an axially elongated hub portion 4a mounted for rotation on the outer race of the thrust bearing 2. The wheel also has a conventional annular end portion 6 having a tire-engaging rim flange 7 and a hub portion 6a mounted for rotation on the outer race of the thrust bearing 3. The two portions 4 and 6 of the annular wheel W are clamped together in the conventional manner with a suitable elastic rubber sealing gasket 8 mounted therebetween to prevent leakage of air through the outer rim portion of the wheel from the tire mounted on the wheel.

The main wheel portion 4 has six, regularly circumferentially spaced, axially elongated, thickened, key-supporting portions 9 which support six steel bars or keys 10 of substantially uniform thickness. Each key 10 has a projecting portion 11 which is preferably inclined axially outwardly of the adjacent portion 9 to facilitate assembly and which has a narrow wire-receiving slot 12 therein. Each key 10 is held in place by two set screws 14 which screw into the adjacent key-supporting portion 9 as shown in FIG. 4 which is drawn substantially to scale. The internally threaded holes receiving the screws 14 terminate a substantial distance from the exterior surface of the wheel so that the wheel is not weakened substantially. Such blind holes may, therefore, be threaded without seriously weakening the wheel.

An annular alluminum heat shield 15 is provided in the form of a smooth endless sheet of uniform thickness having a curved outer edge portion or wire-retaining bead 16 and six regularly spaced elongated slots 17 each terminating short of the opposite ends of the sheet and being of a size to receive the key-supporting portion 9. Each shield is also provided with a series of notches 18 aligned with the slots 17 to expose the U-shaped portion 20 of the wire 19 carried by the bead 16. The six portions 20 fit in the slots 12 of the keys 10 to hold the heat shield concentric to the wheel as shown in FIG. 2. The glossy reflective heat shield may be mounted on the wheel W before insertion of the brake assembly B into the wheel and does not interfere with such assembly.

The disc-type brake assembly B is conventional and includes a stator annulus 22 formed of steel or aluminum (preferably steel) and having a series of regularly circumferentially spaced circular mounting holes 23 to receive the bolts 23a and to facilitate bolting to a stationary part of the airplane's retractable undercarriage. The annulus 22 is shaped to provide eight regularly circumferentially spaced, axially elongated, radially projecting, key portions 24 similar to the portions 9, which may be arranged as indicated in FIG. 1. The annulus 22 has a series of internally threaded holes at the opposite ends of each key portion 24 to receive bolts 25 and 26. The eight bolts 25 rigidly connect said annulus to an annular aluminum alloy or magnesium alloy casting 28 having an inlet portion 35 admitting brake fluid from the supply line 46 to oil passages 27 extending through the casting around the periphery thereof and discharging into branch passages 29. The eight bolts 26 rigidly connect the stator annulus 22 to an aluminum alloy or magnesium alloy casting 30 which provides a stationary pressure plate.

A generally annular aluminum alloy or magnesium alloy pressure plate 31 is provided having a series of regularly circumferentially spaced, cylindrical pistons 32 fitting in the cylinders of the member 28 and receiving fluid from the branch passages 29. The pressure plate 31 is biased toward the member 28 by eight regularly circumferentially spaced helical steel springs 34 which are mounted between the annulus 22 and the radially inwardly projecting portions 33 of the axially movable pressure plate as shown in FIGS. 1 and 2.

Although conventional brake assemblies for many aircraft employ both hydraulic and pneumatic cylinders, the brake assembly has been shown herein with hydraulic cylinders only for simplification, the bleed opening being omitted.

The remainder of the disc-type brake structure will be apparent from an inspection of the drawings and includes a flat, annular layer 36 of asbestos or other suitable insulation on each of the pressure plates 30 and 31. A flat annular steel plate 37 is mounted on each layer 36 and has a conventional flat annular copper-base brake lining 38. The lining 38 is also provided on each of the flat annular stator plates 40, the flat annular rotor plates 39 being free of such brake lining material in the particular brake shown herein.

Each of the rotor plates 39 has six regularly circumferentially spaced ears 41, each having a central slot 42 therein with a width corresponding to the width of the adjacent key portion 9 and key 10 which fit in the slot as indicated in FIG. 3. The slots are of sufficient depth to permit radial expansion and contraction due to heating and cooling of the rotor plates and engage the keys 10 to hold the rotor plates approximately perpendicular to and concentric to the axle 1 while permitting axial movement thereof.

The stator plates 40 have eight regularly circumferentially spaced rectangular slots 43 formed by radially inwardly projecting ears 44, similar to the ears 41 but projecting in the opposite direction as indicated in FIG. 1. Each slot 43 has a width corresponding to the width of the adjacent key portion 24 and receives said key portion while permitting radial expansion and contraction of the associated stator plate 40. The key portions 24, therefore, support the stator plates approximately perpendicular to and concentric to the axle 1 while permitting axial movement thereof. The application of pressure to the fluid in the brake line 46 causes the application of pressure to the ends of the pistons 32 so as to press the pressure plate 31 axially towards plate 30 applying pressure between the rotor plates 39 (which are caused to rotate in unison with the wheel W by the keys 10) and the stationary brake linings 38 of the stator plates 40 which are held against rotation by the key portions 24, the bolts 23a in the holes 23 holding the stator annulus 22 against rotation.

If the brakes drag or if they are applied for an excessive period of time, the temperature of the rotor and stator plates 39 and 40 will rise to extremely high temperatures which sometimes reach 900° to 950° C. or even higher. The great forces exerted by the high pressure tubeless tires on the light metal wheel W against the rim flanges 5 and 7 are apt to cause explosion of the wheel if the wheel itself is heated to high temperatures substantially in excess of 150° C. since the strength of the wheel is greatly reduced at such temperatures even if the melting point is considerably higher. The transfer of heat from the brake assembly B to the wheel is reduced by providing cooling air passages between the wheel and the brake assembly, by insulating the pressure plates 30 and 31 from the rotor and stator plates by means of the insulation 36 and by employing an annular reflective sheet of aluminum as a heat shield 15 supported out of contact with both the wheel and the brake assembly.

It is also desirable to coat the interior surface of the wheel with aluminum paint or special heat reflecting materials particularly in the regions not protected by the heat shield 15.

With a wheel assembly as shown in FIGS. 1 to 4 employing the heat shield 15, the heat travels most rapidly from the rotor plates 39 and through the key portions 9 and keys 10 by conduction, the result being that the key portions 9 are hotter than other parts of the wheel after operation of the brakes.

According to the present invention, the explosion of the wheel by excessive heating thereof can be avoided by providing a series of circumferentially spaced smooth-bore air release passages in the annular portion of the wheel W between the rim flanges 5 and 7 and close enough to the central plane of the wheel to permit escape of air from between the bead portions of the tire on the wheel. Such air release openings are, therefore, preferably located near the medial plane of the brake heat-stack, between the plates 30 and 31 (i.e., within about two inches of said medial plane). The air release openings preferably have a relatively small diameter of about 0.1 to 0.4 inch and preferably less than 0.3 inch. It is also preferred to provide such openings at the hottest parts of the wheel (i.e., at the keys 10) rather than at the coolest portions midway between the keys.

As herein shown, the main wheel portion 4 has six circular smooth-bore air-release openings 48, each shaped to receive a rivet and an O-ring seal and at times having an annular shoulder 49 for engaging the flared end portion of the rivet to hold the rivet in place. Each opening 48 has a circular cross section and is located at the center of a key portion 9 at the central portion of the wheel near the medial plane thereof and almost midway between the released pressure plates 30 and 31 as shown in FIG. 2 nearest the hottest portion of the brake assembly.

Each of the air release openings 48 has a shape as indicated in FIG. 4 (which is drawn substantially to scale) so as to fit the hollow rivet or fuse plug 50 (which is drawn to scale in FIG. 5) and also to receive the elastic rubber O-ring seal 52, the air pressure within the tire overcoming the centrifugal force of the fuse plug 50 and holding the plug against the O-ring to maintain an airtight seal at each of the openings 48 whereby the wheel W is impervious between the rim flanges 5 and 7 and can withstand air pressures of 400 to 500 pounds per square inch or higher without leakage. The keys 10 have six circular vents or air holes 51 therein with a diameter less than that of the openings 48 and radially aligned with said openings 48 as indicated in FIG. 4. Each hole 51 is preferably relatively small or otherwise shaped to minimize radial heat transfer to the fuse plug but preferably has a sufficient size to permit escape of air at the desired rate when the wheel is overheated.

As shown in FIG. 5, the fuse plug or rivet 50 of the present invention has an externally cylindrical, axially elongated, tubular intermediate portion 53 which is enlarged at its upper end to provide a radially outwardly extending frusto-conical head 54 for engaging the O-ring 52. The hollow rivet 50 also has a tapered internal surface of revolution 55 which gradually increases in diameter in a direction toward the head 54 and has a radially enlarged bottom recess 56 surrounded by a flared end portion 57 of reduced radial thickness. The flared portion 57 may be cylindrical and flared outwardly by a suitable tool after being positioned on the wheel W as is the usual practice in the riveting art, but it is better to avoid the use of an expanding tool when mounting the rivet so as to facilitate assembly and to permit removal and replacement of the rivets.

It is, therefore, preferable to form the flared end portion 57 prior to assembly so that it has a rounded bulge with an external diameter slightly greater than the intermediate portion 53 and slightly greater than the internal diameter of the opening 48 and so that such portion may contract within its elastic limit when forced through the smooth axially elongated opening 48 so as to expand radially below the optional shoulder 49 after assembly to hold the rivet in place. As herein shown, a pair of diametrically opposed slots 58 are provided but are not necessary in the flared portion 57 to facilitate contraction thereof within the elastic limit of the material, the portion 57 being provided with a curved exterior surface of revolution 59 having a diameter slightly greater than that of the intermediate portion 53 and the internal diameter of each opening 48. Thus the portion 57 is axially tapered in two directions.

As indicated in FIG. 4, which is drawn substantially to scale, each air release opening 48 has an internal surface which corresponds in shape to the external surface of the fuse plug 50. The cylindrical bore which engages the body portion 53 has a smooth axially elongated cylindrical surface which preferably has almost the same diameter as the smooth exterior surface of the body portion 53, the clearance preferably being no more than one or two thousandths of an inch depending on the type of material used to form the tubular rivet. As herein shown, a counter bore is provided below the aforesaid internal cylindrical surface to provide a shoulder 49 for engaging the flared portion 57 to prevent the rivet from accidentally falling out of the opening 48. This counter bore is not essential in that a tight fit between the flare 57 and opening 48 will also prevent the rivet from accidentally falling out. At the opposite outer end of the smooth internal cylindrical surface, an annular recess is provided of a size to receive the O-ring 52, as shown in FIG. 4, so that the O-ring is compressed to provide an air tight seal when the rivet is in place, the opening 48 having a smooth frusto-conical surface of the same shape as the external frusto-conical surface of the head 54 so as to permit such sealing. If desired, the frusto-conical surface of the opening 48 may be substantially in contact with the head 54 when the rivet is in place but this is not necessary.

It is relatively simple to fill the hollow rivet 50 with a soft malleable metal having a low melting point, for example, by warming such material and pounding it into the rivet while holding a rod in the recess 56 against the shoulder formed by the bottom of the portion 53 or merely by inserting a properly shaped frusto-conical piece or inserting a cylindrical piece and hammering it tightly into place. Very little or no adhesion is necessary between the low melting material of the plug 60 and the hollow rivet since the high air pressure within the tire overcomes centrifugal force and holds the material against the tapered surface 55. All that is necessary is to prevent the plug from falling out accidentally while the air pressure is reduced.

The minimum diameter of the internal surface 55 is preferably about 0.05 to 0.2 inch and ⅓ to ⅔ the diameter of the intermediate portion 53. Said minimum diameter is also preferably equal to or slightly greater than the diameter of the opening 51 with which it is radially aligned as shown in FIG. 4.

The hollow rivet 50 may be formed of steel or a magnesium or aluminum alloy and may be made of the same material as the wheel W. The wheel W may be made of a light weight metal alloy, such as a magnesium or aluminum alloy, having a melting point of about 600° to 1000° C. and a density of 100 to 200 pounds per cubic foot or may be made of a heavier alloy such as steel having a melting point up to 1600° C. or more and a density up to 500 pounds per cubic foot.

The axially elongated frusto-conical plug 60 filling the hollow rivet and extending from the top of the head 54 to the bottom shoulder of the intermediate portion 53 is made of a material having a much lower melting point than the material of the tubular rivet. The material is preferably a metal having a melting point of 175° C. to 250° C. particularly when employed at the hottest portion of the wheel as in the wheel shown herein. The melting point will vary, however, between 150° and 300° C. depending on the type of material used in the wheel W, the strength of such material at high temperatures, and the distance from the plug to the hottest part of the wheel. Various eutectic alloys or the like may be employed to provide the low melting fuse plug material 60 as will be apparent to those skilled in the art. The material is preferably selected so that the entire plug will melt rapidly within a narrow temperature range, but it will be apparent that plugs having wide melting ranges may also be employed and that non-metallic plugs might also be used. The material may have a wide melting range of 20 degrees centigrade or more but preferably has a narrow melting range not in excess of 10 degrees centigrade. Suitable materials are available which will melt completely when heated to a temperature only a few degrees in excess of the initial melting point.

Various tin-lead alloys including the solders have melting points within the desired range and may be used in the practice of this invention. The solders may be conventional pure tin solders or the like. Various other fusible alloys of tin or lead might also be employed including various alloys such as bismuth-cadmium alloys, tin-cadmium alloys, lead-tin alloys, or the like. The alloys of true eutectic composition may be used and have the advantage that they melt sharply at their indicated melting points but remain solid at temperatures just below the melting point. Some alloys tend to be pasty over a wide range of temperatures and are unsafe for use in airplane wheels since it is difficult to predict when they will release the air from the small openings 48.

A better air seal is provided if the rivet 50 has a tight fit in the opening 48 and is made of the same material as the wheel, but the blind rivet shown in FIG. 5 may be made of steel to provide the portion 57 with a high degree of elasticity and to permit a substantial radial expansion thereof.

The present invention relates to vehicle wheels and more particularly to wheels made of light metal alloys and employed with high pressure tubeless tires. The wheel itself and the metal parts of the brake assembly B except the bolts and the stator member 22 are preferably made of an aluminum or magnesium alloy or other high strength alloy having a density of 100 to 200 pounds per cubic foot and a melting point of 600° to 1000° centigrade. The tubular rivet 50 enclosing the plug 60 is also made of a metal having a melting point above 500° C. and may be made of steel but provides a better seal when made of the same light metal as the metal forming the wheel.

The light metal forming the wheel W is preferably rather strong at temperatures below 200° C. and can safely withstand high air pressures in the neighborhood of 300 to 500 pounds per square inch or more. Pressures of about 250 pounds per square inch are now used in many airliners, and pressures in excess of 400 pounds per square inch are now use in some military aircraft. The strength of the wheel is greatly reduced at extremely high temperatures greatly in excess of 150° C. and failure of the wheel is apt to occur at such high temperatures if the air pressure is not reduced materially. The fuse plug of the present invention solves this problem and provides a very effective seal at lower temperatures even at pressures of 400 to 500 pounds per square inch or more. The blind rivet shown in FIG. 5 permits removal of the rivet and replacement of the O-ring seal when the tire is removed without disassembling the wheel or separating the wheel or separating the brake assembly B from the wheel.

The wheel and the rivet may be made of the same aluminum or magnesium alloy. Such materials are conventional and form no part of the present invention. The material may, for example, be a Duralumin-type alloy or the like or various well known magnesium alloys of high strength.

The initial melting point selected for the plug 60 will be higher for wheel metals which retain their strength at higher temperatures and will be lower if located at a portion of the wheel which is well insulated from the heat. The plug for a given wheel might, for example, have an initial melting point of about 175° C. if located at the coolest part of the light weight metal wheel midway between the keys 10 and might be about 200° to 220° C. for the same wheel if located at the hottest part of the wheel. It is undesirable to locate the plug and the air release hole sealed by the plug at a cooler portion of the wheel since the lower melting point required for the plug might result in releasing the air before the entire wheel was heated to a dangerously high temperature. This could occur, for example, if the brakes were applied slowly over a very long period of time to effect gradual warming of the wheel. It is, therefore, preferable to locate the air release openings at the hottest part of the wheel near the center of the rotor and stator plates and adjacent the point where the rotor plates engage the wheel.

Since hot air tends to rise, the hottest portion of the wheel is usually the top of the wheel after the wheel is allowed to come to rest. Explosions of wheels usually occur after landing and after the wheel has been stopped for several minutes, a considerable period of time being required to transfer heat from the brake to the wheel in sufficient quantity to damage the wheel. A series of air release openings 48 are provided so that at least one of these openings will be located near the top of the wheel. It is preferably to employ a series of openings and best results are obtained using at least three openings or at least one for each key 10.

It is preferable to provide the heat shield 15, which protects most of the outer rim except the keys 10, so as to insure that the uppermost key 10 and the associated fuse 60 are located at the hottest part of the stationary wheel after rotation of the wheel has been stopped by the brake. It is then possible to use a somewhat higher initial melting point for the fuse material 60 and to avoid releasing the air pressure before it is really necessary. Where the wheel is constructed in this manner using present-day aluminum or magnesium alloys, the initial melting point of the fusible material at 60 is preferably about 200° to 250° centigrade, but this may be increased for improved higher strength alloys developed hereafter. The aluminum alloys now used contain at least 75 percent and usually at least 80 percent by weight of aluminum. Likewise, the present day magnesium alloys contain at least 75 percent and usually at least 80 percent magnesium, but different alloys may be developed hereafter which are also suitable for airplane wheels.

It is preferable to employ conventional heat-resistant elastic rubber O-rings in conjunction with the rivet-like fuse plugs of this invention, but other non-hardening materials such as those employed for sealing high temperature pipe joints or various other materials may also be employed to prevent leakage of air around the rivet.

It will be understood that the above description is by way of illustration rather than limitation and that, in accordance with the provisions of the patent laws, variations and modifications of the specific devices shown herein may be made without departing from the spirit of the invention.

Having described my invention, I claim:

1. In an airplane wheel having a brake assembly surrounded by an annular tire-supporting rim having bead-engaging rim flanges at opposite sides thereof, the improvement which comprises an annular sheet metal heat reflector mounted between the brake assembly and said rim and having a series of regularly circumferentially spaced axially elongated slots therein, said rim having a series of circumferentially spaced axially elongated key portions projecting radially inwardly through said slots, a generally cylindrical air release hole formed in each of said key portions between the rim flanges and having a frusto-conical recess at its outer end, an elastic O-ring for each hole, means providing an annular recess at the bottom of said frusto-conical recess for receiving said O-ring, and a fuse plug mounted in each hole and sealingly engaging the O-ring, said plug comprising a hollow annular metal rivet of a size to fit in and fill the air release hole having a frusto-conical head filling said frusto-conical recess and engaging said O-ring, said rivet being formed of a metal having a melting point in excess of 500° C. and being filled with a metal which melts substantially completely within a temperature range of 20 degrees centigrade and which has an initial melting point of about 200° to 250° C.

2. In an airplane wheel assembly comprising an axle, a disc-type brake assembly B including a brake stator annulus concentric to said axle and having a series of regularly circumferentially spaced brake cylinders mounted thereon, means at one end of said brake annulus for holding said annulus against rotation, an annular metal pressure plate rigidly connected to the opposite end of said brake annulus concentric to and spaced from said axle, an axially movable annular pressure plate having pistons mounted in said brake cylinders, and a series of alternate flat annular rotor and stator plates located between said pressure plates and mounted for axial movement on said brake annulus, means for holding the stator plates against rotation, means for supplying pressure fluid to said cylinders to force the pressure plates towards each other and to force the rotor and stator plates into engagement to effect braking by friction and to generate heat, a wheel formed of a metal alloy having a density of about 100 to 200 pounds per cubic foot, said wheel having a hub portion mounted for rotation on said axle and an annular rim portion concentric to said axle and enclosing said pressure plates and said rotor and stator plates, said hub portion extending axially from a point on said axle near said one end of said brake annulus and beyond said stationary pressure plate and said rim portion having a first tire-bead-engaging rim flange at one side thereof axially outwardly of said stationary pressure plate, a second tire-bead-engaging rim flange at the opposite side thereof axially outwardly of said axially movable pressure plate, and a series of regularly circumferentially spaced axially elongated key portions between said rim flanges radially outwardly of said rotor plates which project radially inwardly and engage said rotor plates to cause the rotor plates to rotate in unison with said wheel, and a tubeless pneumatic elastic rubber tire mounted on said wheel and having inextensible bead portions engaging the axially inner surfaces of said rim flanges, said tire being inflated with air under a pressure of about 300 to 500 pounds per square inch and applying forces to said rim flanges tending to explode the wheel, the improvement which comprises a circumferential heat reflecting layer surrounding and spaced from said rotor and stator plates between said plates and said rim member and spaced from said key portions to reduce the transfer of heat to the rim portion between said key portions, an air release opening in each of said key portions between the bead portions of said tire having a smooth axially elongated bore, a frusto-conical outer surface, and an annular recess between said bore and said frusto-conical surface filled with a heat-resistant elastic rubber ring, and a series of tubular rivets of a size to fit in each air release opening each having a frusto-conical head sealingly engaging said rubber ring and a tapered passage therethrough sealed with a metal having an initial melting point of about 200° to 250° C. which melts completely when heated 10 degrees centigrade above said initial melting point, said tapered passage increasing in diameter in a direction toward said head, the tubular portion of said rivet being formed of a metal having an initial melting point in excess of 500° C.

3. An airplane wheel assembly for high pressure tubeless tires comprising a rotary brake-enclosing wheel having an air-impervious annular peripheral portion terminating in two tire-bead-engaging rim flanges, said annular peripheral portion having a series of integral circumferentially spaced axially elongated radially inwardly projecting key portions, and a disc-type brake assembly mounted within said wheel comprising a brake annulus and a pair of pressure plates located within said annular peripheral portion, means for holding the brake annulus against rotation, a series of flat annular rotor and stator plates mounted between said pressure plates and perpendicular to the axis of rotation of said wheel, said rotor plates having means forming a series of circumferentially spaced slots therein for receiving said key portions and for causing said rotor plates to rotate in unison with said wheel, said brake annulus having a series of circumferentially spaced axially elongated radially outwardly projecting key portions, said stator plates having means forming a series of circumferentially spaced slots therein for receiving said last-named key portions and for holding said stator plates against rotation, means forming a series of small circumferentially spaced circular openings in said annular portion around the periphery of the wheel for releasing air from between the beads of a tire on said wheel, each opening having a smooth axially elongated cylindrical internal surface, and fuse plug means for sealing each of said openings comprising a hollow metal rivet formed of a metal having a density of about 100 to 500 pounds per cubic foot and a melting point of about 600° to 1500° C. and filled with a metal having a melting point of about 175° to 250° C., said annular portion and said rim flanges being formed of a metal having a density of about 100 to 500 pounds per cubic foot and a melting point of about 600° to 1500° centigrade, said openings in said annular portion containing said rivets being located in said first-named key portions to receive heat from the brake by conduction, whereby said rivets are located at the parts of the wheel which are hottest when the wheel is over-heated by the transfer of heat from said brake assembly.

4. A wheel assembly for high pressure tubeless tires comprising an annular rim member for enclosing a friction brake, said rim member being formed of an aluminum alloy and having key means for engaging parts of said brake spaced around the periphery, air release means mounted in said rim member comprising a series of circumferentially spaced tubular metal rivets, each having a solid core which melts at a temperature in the range of about 175° to 250° C. to release air from the tire carried by said wheel assembly when the temperature of the wheel is excessive, each of said rivets being located in said key means, the tubular portion of each rivet being formed of an alloy consisting predominantly of aluminum and having an enlarged head at one end and an outwardly flared holding portion at its opposite end, said rim member having a series of air release openings in said key means, each with an internal surface having a shape corresponding substantially to that of the head and intermediate portions of the rivet mounted therein, each air release opening having an enlarged radially inner portion for receiving the flared end portion of the rivet therein.

5. An airplane wheel assembly for high pressure tubeless tires comprising air release means including a series of circumferentially spaced tubular metal rivets having frusto-conical heads, a rotary brake-enclosing wheel having an air-impervious annular peripheral portion terminating in two tire-bead-engaging rim flanges, said annular peripheral portion having a series of integral circumferentially spaced axially elongated radially inwardly projecting key portions, and a disc-type brake assembly mounted within said wheel and having portions engageable with said key portions, means forming a series of small circumferentially spaced openings of circular cross section in said key portions for receiving said rivets, each opening having a smooth axially elongated cylindrical internal surface with a diameter corresponding to that of the intermediate portion of each rivet and a frusto-conical outer surface with a shape corresponding substantially to that of the head of the rivet, each opening being enlarged at its radialy inner end to receive the end portion of the rivet, and a heat-resistant ring of elastic material mounted between each rivet head and the frusto-conical surface of the associated opening.

6. A wheel assembly as defined in claim 5 wherein each rivet comprises a tubular body with a smooth axially elongated cylindrical outer surface and a tapered axially elongated passage therethrough filled with a metal alloy which melts at a temperature of about 200° to 250° C., said body being made of an alloy consisting predominantly of aluminum and having an enlarged relatively thick frusto-conical head at one end with a relatively thin outwardly flared holding portion at its opposite end, said outwardly flared portion being bulged and axially tapered in two directions and being split circumferentially to facilitate assembly and disassembly.

References Cited in the file of this patent

UNITED STATES PATENTS

| | | |
|---|---|---|
| Re. 21,058 | Huck | Apr. 25, 1939 |
| 1,151,764 | Dodson | Aug. 31, 1915 |
| 1,344,596 | Schaefer | June 22, 1920 |
| 1,847,391 | Fisher | Mar. 1, 1932 |
| 2,580,340 | Zimmer et al. | Dec. 25, 1951 |
| 2,871,905 | Stanton | Feb. 3, 1959 |
| 2,916,105 | Dasse et al. | Dec. 8, 1959 |